(12) United States Patent
Weller et al.

(10) Patent No.: US 7,237,166 B2
(45) Date of Patent: Jun. 26, 2007

(54) SYSTEM AND METHOD FOR EVALUATING A MULTIPROCESSOR SYSTEM USING A RANDOM BUS TRAFFIC GENERATION TECHNIQUE

(75) Inventors: Christopher Todd Weller, Ft. Collins, CO (US); Paul James Moyer, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 835 days.

(21) Appl. No.: 10/278,578

(22) Filed: Oct. 23, 2002

(65) Prior Publication Data

US 2004/0083415 A1 Apr. 29, 2004

(51) Int. Cl.
*G06F 11/00* (2006.01)
(52) U.S. Cl. ...................... 714/739; 714/742
(58) Field of Classification Search .......... 714/43, 714/25, 28, 742, 739; 710/105, 315, 113
See application file for complete search history.

(56) References Cited

U.S. PATENT DOCUMENTS

| | | | |
|---|---|---|---|
| 4,475,195 A | 10/1984 | Carey | |
| 4,622,669 A * | 11/1986 | Pri-Tal | 714/43 |
| 4,961,140 A * | 10/1990 | Pechanek et al. | 710/105 |
| 5,548,713 A * | 8/1996 | Petry et al. | 714/25 |
| 5,646,949 A | 7/1997 | Bruce, Jr. et al. | |
| 5,724,527 A * | 3/1998 | Karnik et al. | 710/315 |
| 5,787,270 A | 7/1998 | Bloomer et al. | |
| 5,954,824 A * | 9/1999 | Cherichetti et al. | 714/28 |
| 6,018,808 A | 1/2000 | Schieve | |
| 6,058,253 A | 5/2000 | Lowe | |
| 6,253,344 B1 | 6/2001 | Fin et al. | |
| 6,877,053 B2 * | 4/2005 | Lahiri et al. | 710/113 |

OTHER PUBLICATIONS

IBM, "SPD Bus Throughput Accelerator", IBM Technical Disclosure Bulletin, Sep. 1, 1987, vol. 30, pp. 1828-1829.*

* cited by examiner

*Primary Examiner*—David Ton (57) ABSTRACT

A system and method for evaluating a multiprocessor system having multiple processors coupled via a system bus is disclosed. A test vector is executed on a processor under test. While the test vector is being executed, an instruction that causes a transaction to be issued on the system bus is executed on another processor, thereby stressing the first processor.

24 Claims, 5 Drawing Sheets

SYSTEM AND METHOD FOR EVALUATING A MULTIPROCESSOR SYSTEM USING A RANDOM BUS TRAFFIC GENERATION TECHNIQUE

BACKGROUND OF THE INVENTION

1. Technical Field of the Invention

The present invention generally relates to multiprocessor systems. More particularly, the present invention is directed to a system and method for evaluating a system of processors.

2. Description of Related Art

Without limiting the scope of the invention, the Background of the Invention is described in connection with systems of microprocessors, as an example. The functional verification of a system of microprocessors is concerned with ensuring a high degree of confidence in the functional quality and integrity of the system. More specifically, the functional verification of microprocessor systems includes extensive testing to diagnose any discrepancies between the design of the microprocessor system and intended functional behavior that affect the performance and electrical characterization of the microprocessor system.

Typically, a simulation-based verification tool, such as a manual or hand-coded test generation tool or a pseudo-random test generation tool, is employed to uncover errors by executing one or more test suites on the multiprocessor system and comparing the state of a particular processor under test (PUT) with an expected state after the test suites are applied.

In functional verification, an important metric to monitor is test coverage which is a measure of the completeness of the test suite with respect to a particular hardware platform. Following the execution of a test suite, data is analyzed to determine test coverage and to identify regions of the behavior of the processor system that are not well covered by the verification tool. Usually, verification engineers manually tune the verification tool or write a focused test sequence to supplement the gap in coverage. Typically, such tuning cannot be completely generated by software, but must instead be hand-coded by a verification engineer familiar with the target processor system. In addition to hand-coding the focused test sequence, the verification engineer must determine the proper expected state of the test sequence from the PUT.

In order to maximize test coverage and minimize the amount of manual tuning, a verification tool is sometimes employed in conjunction with ad hoc bus traffic code that is executed on each PUT. The bus traffic code increases the coverage of the verification tool by stressing the PUT and increasing the number of unique situations to which the processor is exposed.

Figure 1:
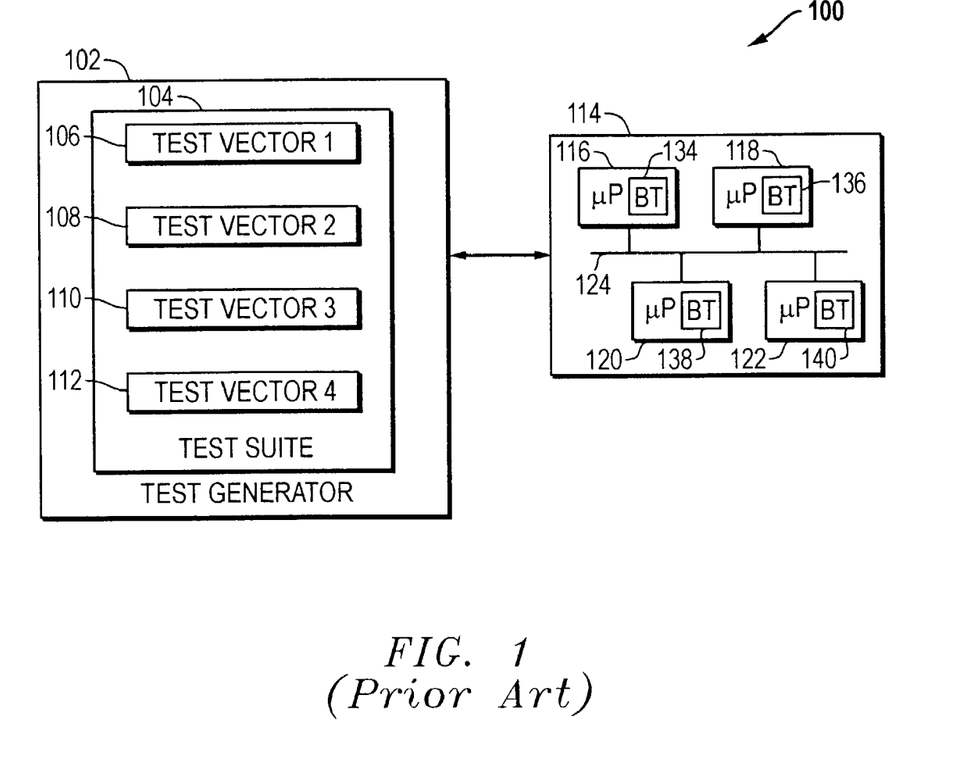
FIG. 1 (Prior Art) depicts a functional schematic diagram of a conventional system for evaluating a multiprocessor platform having multiple processors coupled via a system bus.

A prior art system 100 for evaluating a multiprocessor platform 114 having multiple processors coupled via a system bus 124 is depicted in FIG. 1. A test generator 102 employing a verification tool such as pseudo-random test generation tool includes a test suite 104. Multiple test vectors operable with respect to the multiprocessor system 114, e.g., test vectors 106-112, are included in the test suite 104. The processor system 114 is exemplified with four microprocessors under test 116-122 coupled via the system bus 124. Each microprocessor is provided with specific bus traffic (BT) code that is integrated with its execution environment. As illustrated, BT 134 is included with processor 116, BT 134 is included with processor 116, BT 136 with processor 118, BT 138 with processor 120 and BT 140 with processor 122. Typically, the BT code is executed on the processors regardless whether a particular processor is executing any test code or not, in order to stress the operation of processors and thereby increase code coverage.

It has been found, however, that the existing schemes for evaluating multiprocessor systems are not without limitations. In particular, simultaneously maximizing coverage and throughput, that is, the number of test cases executed on a PUT during a specified period of time, has proved to be difficult. The code for creating bus traffic in order to maximize coverage monopolizes a PUT's computational time, and thus sacrifices throughput for test coverage.

SUMMARY OF THE INVENTION

A system and method for evaluating a multiprocessor system having a plurality of processors coupled via a system bus is disclosed. A test vector is executed on a processor under test. While the test vector is being executed, an instruction that causes a transaction to be issued on the system bus is executed on another processor, thereby additionally stressing the first processor.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 2:
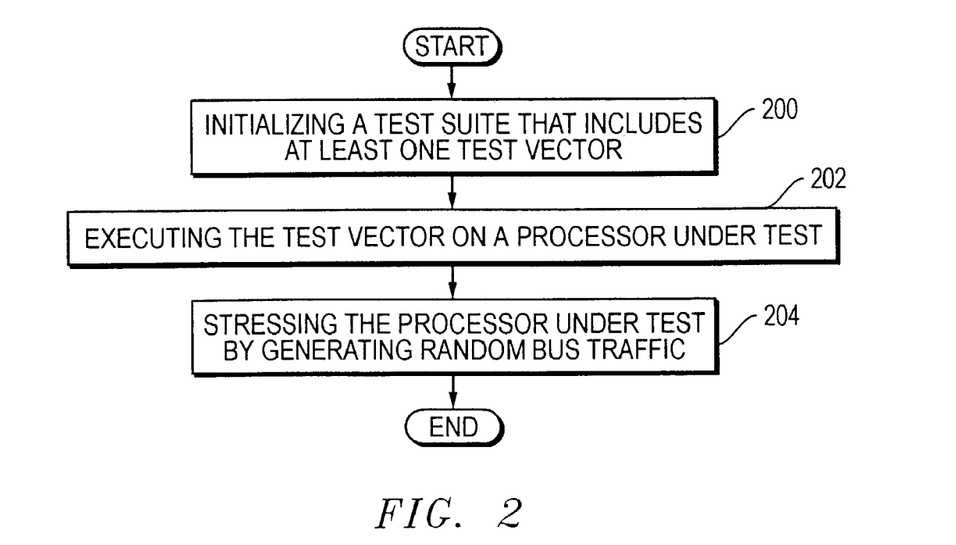
FIG. 2 depicts a flow chart of the various operations involved in one embodiment of the present invention's method for evaluating a multiprocessor platform.

In the drawings, like or similar elements are designated with identical reference numerals throughout the several views thereof, and the various elements depicted are not necessarily drawn to scale. Referring now to FIG. 2, depicted therein is a flow chart of the various operations involved in one embodiment of the present invention's method for evaluating a multiprocessor platform having a plurality of processors coupled via a system bus. At block 200, a test suite that includes at least one test vector is initialized. In one configuration, a test generator, which may comprise any combination of hardware, software, and firmware, generates the test suite. Each test vector may comprise one or more test cases or instructions for a processor under test (PUT) to execute.

At block 202, the test vector is executed on a PUT in accordance with a predefined execution flow. The PUT may be any processor within the multiprocessor system. As will be discussed in more detail hereinbelow, the test vector verifies the functionality of the PUT by performing extensive functional testing to ensure that the design of the multiprocessor system implements the intended functional behavior. The processors of the multiprocessor system may include processors of any design for which evaluation information is desired; for instance, complex instruction set computation (CISC) processors, reduced instruction set computation (RISC) processors, simputers, graphic processor units, and the like may be employed in the practice of the present invention.

At block 204, the PUT is stressed by random bus traffic operable to traverse the system bus to which it is coupled. The random bus traffic may be generated by the test generator, a processor within the multiprocessor system coupled to the system bus, or a processor outside the multiprocessor system that is in communication with the multiprocessor system. In a further embodiment, the random bus traffic is caused by executing one or more low-level or machine language commands on the system bus. Examples of such commands include load, store, flush, purge, et cetera, that will cause a transaction to be issued on the system bus. Regardless of the instruction selected for causing random bus traffic, however, it should not be one that will cause the PUT to fail. Rather, the selected assembly instruction should be one that will affect system coherency or ordering which will force the PUT to do its work in a different manner.

Figure 3A:
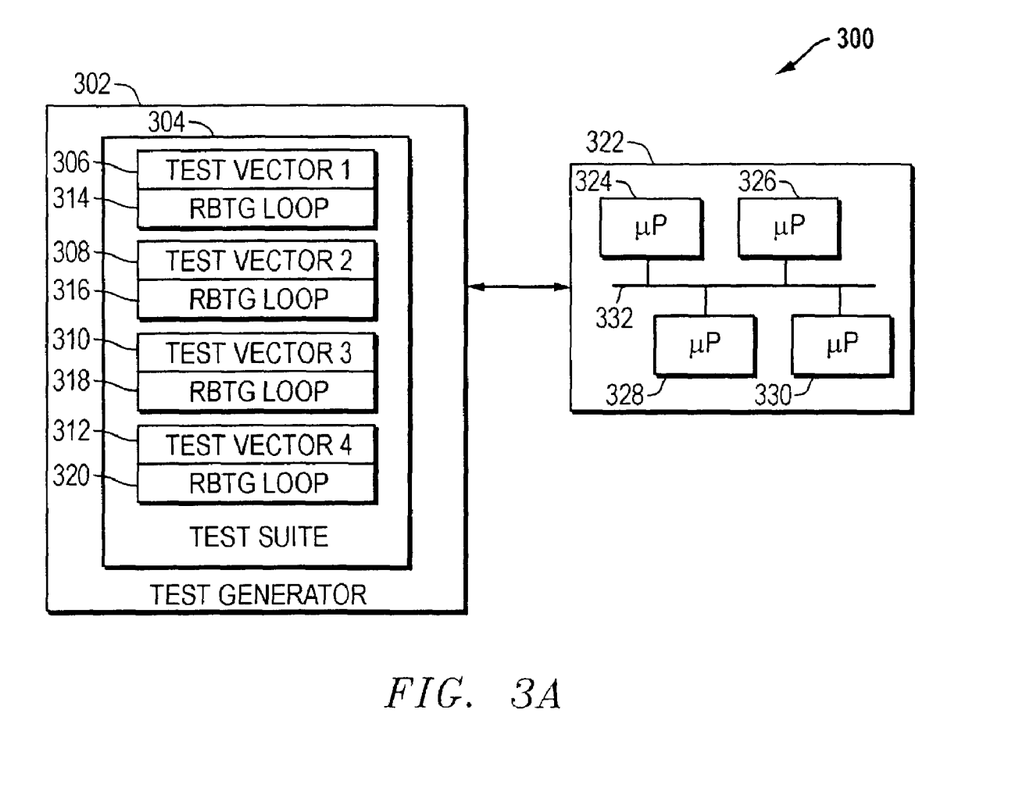
FIG. 3A depicts a functional schematic diagram of one embodiment of the present invention's system for evaluating a multiprocessor platform.

FIG. 3A depicts one embodiment of a system 300 for evaluating a multiprocessor platform 322 in accordance with the teachings of the present invention. A test generator 302 employing a verification technique includes a test suite 304 that is comprised of a plurality of test vectors 306-312. The test vectors 306-312 may be developed using a variety of simulation-based verification techniques such as hand-coded test generation, pseudo-random test generation, or template-based test generation. For example, a verification engineer, with an intimate understanding of the multiprocessor system 322, may write a very powerful and yet small set of hand-coded test vectors that are very effective in exercising the design.

Random bus traffic generator (RBTG) loops 314-320 are associated with each test vector 306-312, respectively. The microprocessor system 322 exemplifying four microprocessors under test 324-330 is coupled to the test generator 302 by any conventional technique. A system bus 332 coupled with the four microprocessors under test 324-330 is operable to carry processor-related instructions, data access, and the like. As illustrated, the microprocessors under test 324-330 are conventional microprocessors which perform arithmetic, logic and control operations with the assistance of internal memory; however, as previously discussed, other devices are within the teachings of the present invention. Moreover, although a system of four microprocessors is illustrated, it should be appreciated that the system may comprise any number of microprocessors.

In one embodiment, each RBTG loop 314-320 is comprised of a code portion which, when executed on a processor of the system 322, is operable to generate one or more random assembly instructions in an iterative manner that will cause traffic on the system bus 322. As pointed out earlier, such random assembly instructions may comprise low-level instructions like load, store, purge, et cetera, that will not cause the PUT to fail. Otherwise, the test coverage data would be confounded. Accordingly, as previously discussed, the instruction should be an instruction that affects system ordering and code coherency, thereby forcing the PUT to perform its work in a different manner and increasing the test exposure. In one implementation, transactions may continue to be executed on the system bus 332 until every PUT has completed executing its test code. The continuous execution of the random transactions complicate the execution environment of the test vector by the PUT, thereby exposing it to additional unexpected fault scenarios that may arise in a customer environment. The RBTG loops 314-320 may be executed on any processor, as opposed to the existing bus traffic code which is processor-specific and built into the specified processor's execution environment.

In an operational embodiment, after the test generator 302 has generated the test suite 304 and stored the test suite 304 in internal memory, the test generator 302 causes the microprocessors 324-330 to execute test vectors 306-312, respectively. Alternatively, the test vector execution could be staged. Moreover, execution of the random bus traffic generator loops may also be staged such that a random bus traffic loop does not run on a processor until its test code execution is completed. Upon finishing the execution of a test vector, each PUT is operable to execute a random bus traffic loop, thereby successively increasing the traffic load on the system bus 332. Accordingly, the random bus traffic generator loops 314-320 can be "tuned" to increase test coverage while maximizing throughput. Once the PUTs have executed the test vectors, the test generator 302 verifies the results by comparing the observed processor states with the expected states.

Figure 3B:
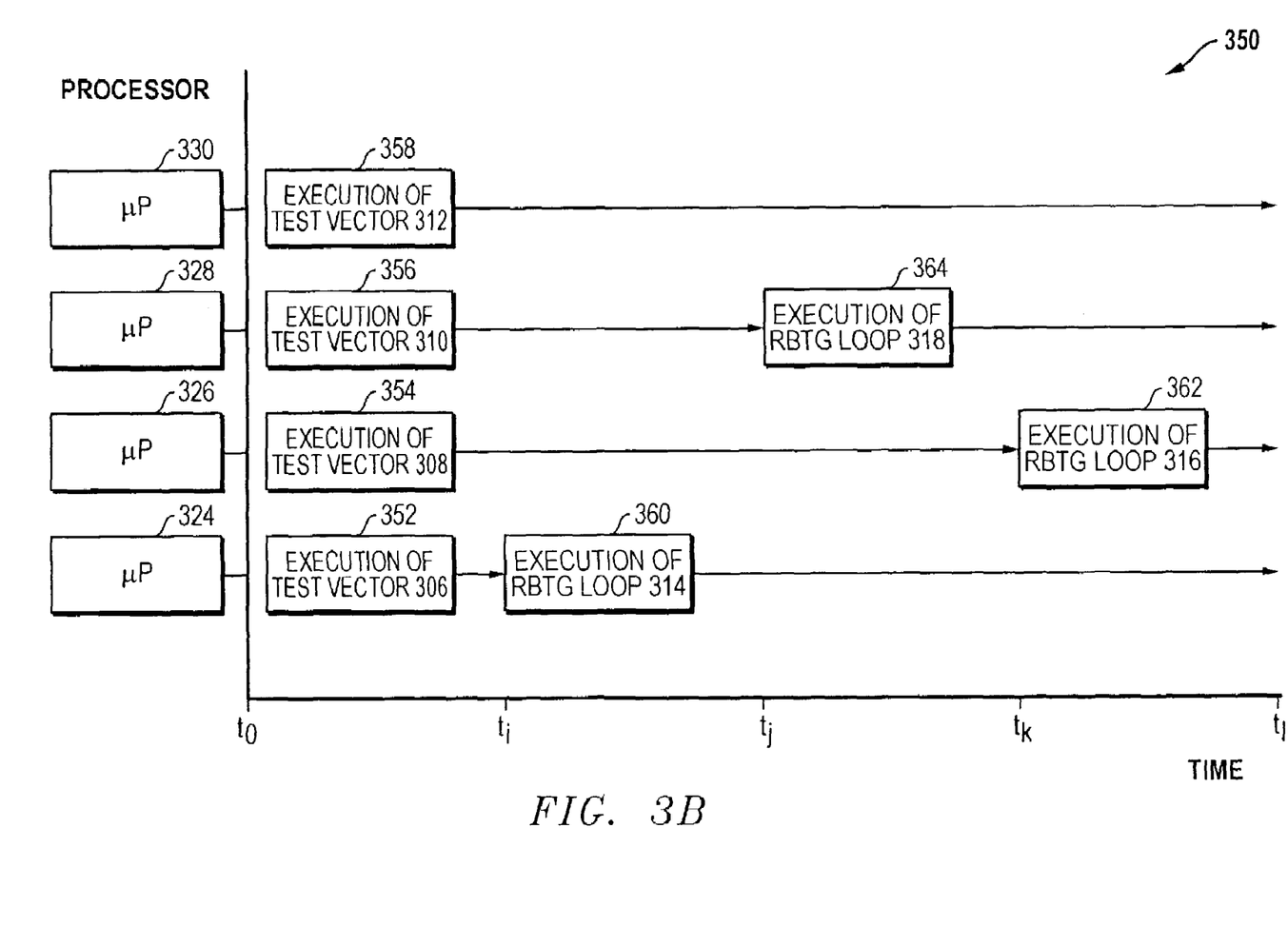
FIG. 3B depicts an execution flow diagram illustrating the flow of operations involved in the system for evaluating the multiprocessor platform illustrated in FIG. 3A.

An execution flow diagram 350 illustrating the various operations with respect to the system 300 is depicted in FIG. 3B. The x-axis illustrates different instance of time $\{t_0, t_i, t_j, t_k,$ and $t_1\}$. The y-axis sets forth the four microprocessors 324-330 that execute test code as well as RBTG loops at different points of the flow. Between time to and $t_i$, each microprocessor 324-330 is executing a test vector 352-358, respectively, as illustrated by blocks 352-358. At time $t_i$, microprocessor 324 completes executing test vector 306 and begins execution of the RBTG loop 314, as illustrated by block 360. The continuous execution of the random transactions complicates the execution of test vectors 308-312 by processors under test 326-330, respectively. For example, in particular, the processor 326 may be holding certain information within its data cache, including any changes test vector 308 might have made to the data. RBTG loop 314 issues an instruction that accesses the area of memory that processor 326 is holding within its data cache. The instruction stresses the system by forcing the process under test 326 to manage the data correctly and prevent data corruption.

Microprocessor 328 completes executing test vector 310 and begins execution of the RBTG loop 318 at time $t_j$, as illustrated by block 364. Similarly, at time $t_k$, microprocessor 326 completes executing test vector 308 and begins execution of the RBTG loop 316 as illustrated by block 362. At time $t_1$, microprocessor 330 completes execution of the test vector 358. Accordingly, since all the microprocessors in the system have completed testing, execution of RBTG loops 314-318 concludes. As illustrated, each PUT completes the execution of the appropriate test vector prior to beginning the execution of the random bus traffic generation loop, thereby simultaneously optimizing throughput and test coverage.

Figure 4:
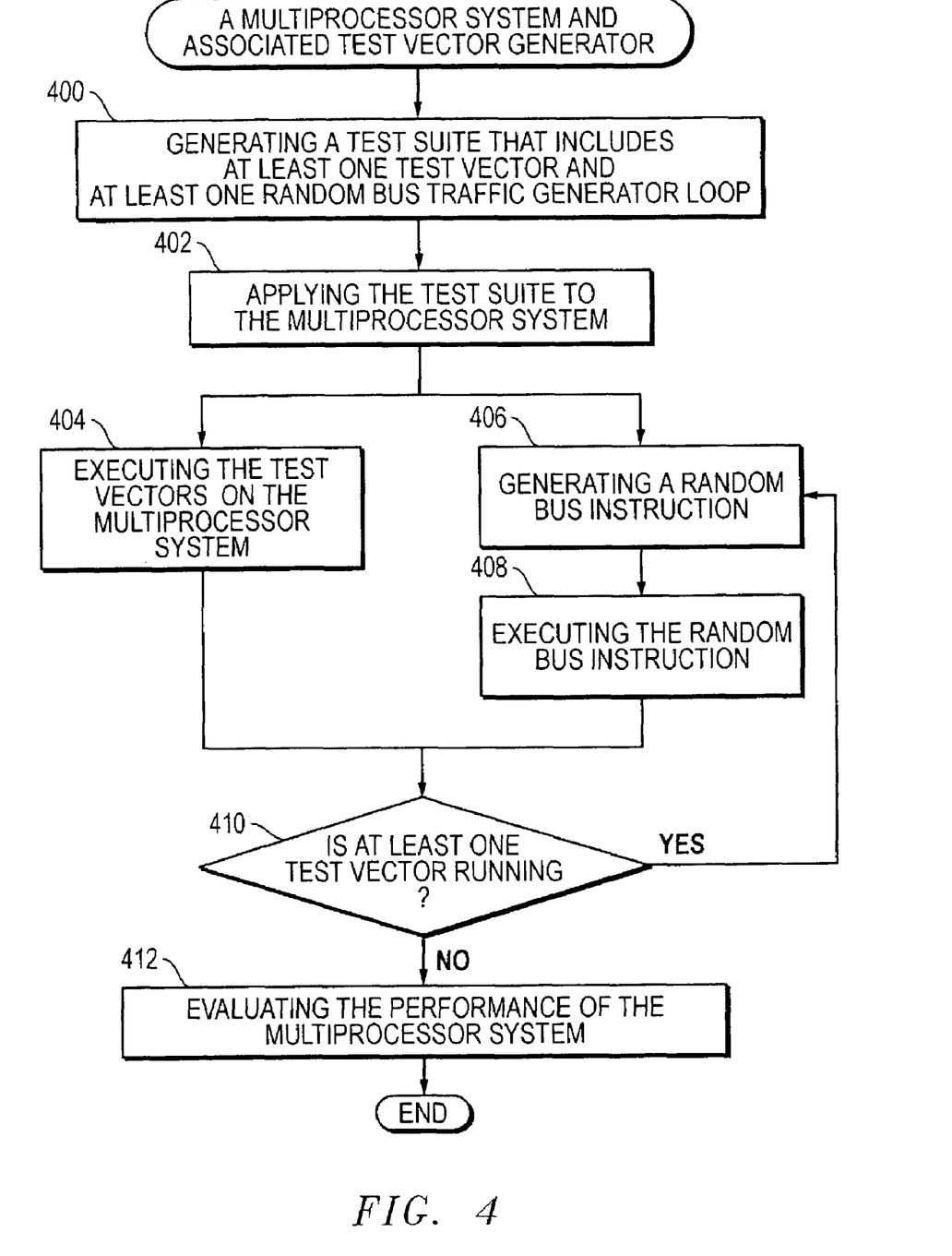
FIG. 4 depicts a flow chart of the additional operations involved in a particular embodiment of the method shown in FIG. 2.

FIG. 4 illustrates the various additional operations involved in a particular embodiment of the method shown in FIG. 2. At block 400, a test suite that includes at least one test vector and at least one random bus traffic generator loop is generated. At block 402, the test suite is applied to the multiprocessor system. At block 404, the test vectors on the multiprocessor system are executed. In parallel, at block 406, a random bus traffic instruction is generated and executed, thus causing a transaction to be issued on the system bus (block 408). The random bus traffic instruction may be generated by the test generator, a PUT that has completed execution of the test vector, a processor not under test within the multiprocessor system, or a processor outside the multiprocessor system. It should be apparent that execution of the test vectors and execution of the random bus traffic generator loop may have staggered initiations. For example, the execution of the test vectors may begin before execution of the random bus traffic instructions.

At decision block 410, if at least one test vector is still running, the operation continues to block 406, wherein another random bus instruction is generated. At decision block 410, if no test vectors are still running, the operation continues to block 412 wherein the performance of the multiprocessor system is evaluated.

The outcome of the verification test may be determined by comparing a PUT's state with an expected state after the test suites are applied. Typically, manual inspection, self-checking testing or other inspection techniques are employed. In manual inspection, the output is inspected through an interface which can be tedious and time consuming. Therefore, manual inspection is usually reserved for diagnosing the root cause of detected discrepancies. In self-checking tests, the PUT's final state is compared to a predetermined final state. The outcome of the self-checking test is a pass or fail. Typically, a combination of manual inspection and self-checking is employed. Self-checking is used to determine whether and where the errors occurred and manual inspection is used to diagnose the root cause of the error.

Figure 5:
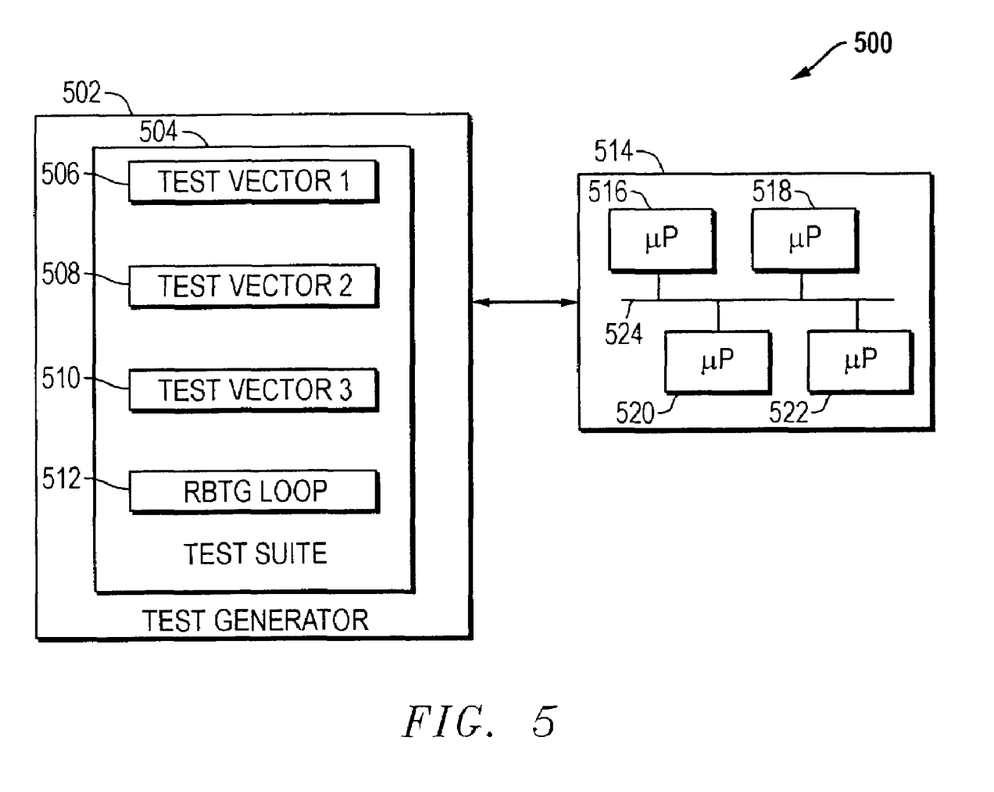
FIG. 5 depicts a functional schematic diagram of another embodiment of the present invention's system for evaluating a multiprocessor platform.

FIG. 5 depicts another embodiment of the present invention's system for evaluating a multiprocessor platform. A test generator 502 employing a verification technique includes a test suite 504 having test vectors 506-510 and a random bus traffic generator loop 512. A multiprocessor system 514 that includes three microprocessors under test 516-520 and a processor not under test 522 is coupled to the test generator 502 by any conventional technique. A system bus 524 couples the four microprocessors 516-522 together.

In the illustrated embodiment, test vector 506 is executed on microprocessor 516, test vector 508 is executed on microprocessor 518, and test vector 510 is executed on microprocessor 520. RBTG loop 512 is executed on microprocessor 522, which is not under test. In operation, as long as one of the test vectors 508-510 is being executed, microprocessor 522 continues to execute RBTG loop 512 so as to produce transactions that stress the processor or processors under test.

It should be recognized that other configurations of test vectors, RBTG loops and processors under test are within the teachings of the present invention as well. For example, the RBTG loop may be code embedded in the memory of microprocessor 522. By way of another example, microprocessor 522 may be outside the microprocessor system 514.

Based on the foregoing, it should be appreciated that the present invention provides a system and method for evaluating a multiprocessor system using a random bus traffic generation technique that overcomes the various deficiencies and limitations of the current solutions. By using available processor time to stress the system, the present invention is able to maximize throughput and provide thorough test coverage of the microprocessor system.

Although the invention has been described with reference to certain illustrations, it is to be understood that the forms of the invention shown and described are to be treated as exemplary embodiments only. Various changes, substitutions and modifications can be realized without departing from the spirit and scope of the invention as defined by the appended claims.

What is claimed is:

1. A method for evaluating a multiprocessor system, comprising;
   initializing a test suite including at least one test vector;
   executing said at least one test vector on a processor under test of said multiprocessor system; and
   stressing said processor under test by generating random bus traffic operable to traverse a system bus to which said processor under test is coupled, wherein said random bus traffic is generated by another processor coupled to said system bus.

2. The method as recited in claim 1, wherein said at least one test vector comprises a test case selected from the group consisting of hand-coded test cases and pseudo-randomly generated test cases.

3. The method as recited in claim 1, wherein said test suite further comprises at least one bus traffic generator.

4. The method as recited in claim 3, wherein said at least one bus traffic generator is associated with said at least one test vector.

5. The method as recited in claim 1, wherein said operation off stressing said processor under test by generating random bus traffic further comprises generating a random bus instruction and executing the random bus instruction.

6. The method as recited in claim 5, wherein said random bus instruction comprises a non-fatal instruction with respect to said processor under test.

7. The method as recited in claim 5, wherein said random bus instruction comprises an assembly instruction.

8. The method as recited in claim 7, wherein said assembly instruction is selected from at least one of a load instruction, a store instruction, a flush instruction, and a purge instruction.

9. A method for evaluating a multiprocessor system having a plurality of processors coupled via a system bus, comprising:
   executing a test vector on a first processor;
   executing an instruction on a second processor while said first processor is executing said test vector, said instruction for causing a transaction to be issued on said system bus, thereby stressing said first processor; and
   monitoring said first processor's performance while being stressed.

10. The method as recited in claim 9, wherein said instruction for causing a transaction to be issued includes an instruction that affects said first processor's operation with respect to system coherency.

11. The method as recited in claim 9, further comprising the operation of continuing to execute instructions on said second processor while said first processor is executing said test vector, said instructions for causing transactions to be issued on said system bus.

12. The method as recited in claim 9, wherein said instruction is operationally associated with a second test vector that is executable on said second processor.

13. A system for evaluating a multiprocessor system, comprising:
   means for generating a test suite including at least one test vector, wherein said test suite is operable to be executed on a processor under test of said multiprocessor system; and
   means for stressing said processor under test by generating random bus traffic operable to traverse a system bus to which said processor under test is coupled wherein said random bus traffic is generated by another processor coupled to said system bus.

14. The system as recited in claim 13, wherein said at least one test vector comprises a test case selected from at least one of a hand-coded test case and a pseudo-randomly generated test case.

15. The system as recited in claim 13, wherein said test suite further comprises at least one bus traffic generator.

16. The system as recited in claim 15, wherein said at least one bus traffic generator is associated with said at least one test vector.

17. The system as recited in claim 13, wherein said means for stressing said processor under test by generating random bus traffic further comprises means for generating a random bus instruction and executing the random bus instruction.

18. The system as recited in claim 17, wherein said random bus instruction comprises a non-fatal instruction with respect to said processor under test.

19. The system as recited in claim 18, wherein said random bus instruction comprises an assembly instruction.

20. The system as recited in claim 19, wherein said assembly instruction is selected from at least one of a load instruction, a store instruction, a flush instruction, and a purge instruction.

21. A computer-accessible medium having instructions operable to be executed on a computer system, wherein said instructions, when executed on said computer system, perform the following operations for evaluating a multiprocessor system that includes a plurality of processors coupled via a system bus:

executing a test vector on a first processor;

executing code on a second processor while said first processor is executing said test vector, said code for causing a transaction to be issued on said system bus, thereby stressing said first processor; and monitoring said first processor's performance while being stressed.

22. The computer-accessible medium as recited in claim 21, wherein said code for causing a transaction to be issued includes code that affects said first processor's operation with respect to system coherency.

23. The computer accessible medium as recited in claim 21, wherein said code comprises a loop, said loop for causing a series of random transactions to be issued on said system bus while said first processor is executing said test vector.

24. The computer-accessible medium as recited in claim 21, wherein said code is operationally associated with a second test vector that is executable on said second processor.

* * * * *

UNITED STATES PATENT AND TRADEMARK OFFICE
CERTIFICATE OF CORRECTION

PATENT NO. : 7,237,166 B2 Page 1 of 1
APPLICATION NO. : 10/278578
DATED : June 26, 2007
INVENTOR(S) : Christopher Todd Weller et al.

It is certified that error appears in the above-identified patent and that said Letters Patent is hereby corrected as shown below:

In column 4, line 34, delete "time to" and insert -- time $t_o$ --, therefor.

In column 6, line 26, in Claim 5, delete "off" and insert -- of --, therefor.

In column 7, line 1, in Claim 13, after "coupled" insert -- , --.

In column 7, line 20, in Claim 19, delete "claim 18" and insert -- claim 17 --, therefor.

In column 8, line 17, in Claim 23, delete "computer accessible" and insert -- computer-accessible --, therefor.

Signed and Sealed this

Second Day of September, 2008

JON W. DUDAS
*Director of the United States Patent and Trademark Office*